(12) United States Patent
He et al.

(10) Patent No.: US 9,105,091 B2
(45) Date of Patent: Aug. 11, 2015

(54) WATERMARK DETECTION USING A PROPAGATION MAP

(75) Inventors: Shan He, Princeton, NJ (US); Dekun Zou, Princeton, NJ (US); Jeffrey Adam Bloom, West Windsor, NJ (US)

(73) Assignee: THOMSON LICENSING, Issy-les-Moulineaux (FR)

( * ) Notice: Subject to any disclaimer, the term of this patent is extended or adjusted under 35 U.S.C. 154(b) by 157 days.

(21) Appl. No.: 13/577,619

(22) PCT Filed: Feb. 7, 2011

(86) PCT No.: PCT/US2011/000223
§ 371 (c)(1),
(2), (4) Date: Aug. 7, 2012

(87) PCT Pub. No.: WO2011/100048
PCT Pub. Date: Aug. 18, 2011

(65) Prior Publication Data
US 2012/0308074 A1 Dec. 6, 2012

Related U.S. Application Data

(60) Provisional application No. 61/337,726, filed on Feb. 9, 2010.

(51) Int. Cl.
*G06T 1/00* (2006.01)
*H04N 21/8358* (2011.01)
*H04N 21/845* (2011.01)

(52) U.S. Cl.
CPC .......... *G06T 1/0064* (2013.01); *H04N 21/8358* (2013.01); *H04N 21/8455* (2013.01)

(58) Field of Classification Search
USPC ........................................................ 382/100
See application file for complete search history.

(56) References Cited

U.S. PATENT DOCUMENTS

| 5,867,109 A | 2/1999 | Wiedeman |
| 6,009,176 A | 12/1999 | Gennaro et al. |

(Continued)

FOREIGN PATENT DOCUMENTS

| CN | 1301462 A | 6/2001 |
| CN | 101218830 | 7/2008 |

(Continued)

OTHER PUBLICATIONS

Liu et al., "Data hiding in inter and inra prediction modes of H.264/AVC," IEEE Int'l. Symposium on Circuits and Systems, 2008 (ISCAS 2008), May 18, 2008, pp. 3025-3028.

(Continued)

*Primary Examiner* — Alex Liew
(74) *Attorney, Agent, or Firm* — Robert D. Shedd; Richard LaPeruta

(57) ABSTRACT

A method for detecting and selecting watermarking in video coding is provided that comprises accessing a list of possible watermarks; generating propagation maps of modifications to the video that would be caused by applying the respective watermarks; generating a detection region responsive to each respective propagation map that includes blocks within the propagation map that collectively rank highest with respect to a selected detection criteria compared to each other region within the propagation map; selecting a threshold metric for evaluating detection regions; and removing watermarks from the list responsive to a comparison of their detection regions with the threshold metric.

21 Claims, 3 Drawing Sheets

(56) References Cited

U.S. PATENT DOCUMENTS

| | | | |
|---|---|---|---|
| 6,064,661 A | 5/2000 | Benn | |
| 6,341,350 B1 | 1/2002 | Miyahara et al. | |
| 6,373,960 B1 | 4/2002 | Conover et al. | |
| 6,415,041 B1 | 7/2002 | Oami et al. | |
| 6,553,127 B1 * | 4/2003 | Kurowski | 382/100 |
| 6,687,384 B1 | 2/2004 | Isnardi | |
| 6,894,628 B2 | 5/2005 | Marpe et al. | |
| 6,900,748 B2 | 5/2005 | Marpe et al. | |
| 7,113,612 B2 | 9/2006 | Sugahara et al. | |
| 7,159,117 B2 | 1/2007 | Tanaka | |
| 7,197,164 B2 | 3/2007 | Levy | |
| 7,286,710 B2 | 10/2007 | Marpe et al. | |
| 7,646,881 B2 | 1/2010 | Zarrabizadeh | |
| 7,839,312 B2 | 11/2010 | Tanaka et al. | |
| 7,865,034 B2 | 1/2011 | So | |
| 7,974,714 B2 | 7/2011 | Hoffberg | |
| 8,121,341 B2 | 2/2012 | Tapson et al. | |
| 8,189,854 B2 | 5/2012 | Watson | |
| 8,559,501 B2 | 10/2013 | Chen et al. | |
| 8,571,256 B2 | 10/2013 | Tourapis et al. | |
| 8,588,459 B2 | 11/2013 | Bloom et al. | |
| 8,824,727 B2 | 9/2014 | Zou et al. | |
| 2002/0071593 A1 * | 6/2002 | Muratani | 382/100 |
| 2002/0097892 A1 | 7/2002 | Oami et al. | |
| 2002/0136428 A1 | 9/2002 | Sugahara et al. | |
| 2003/0070075 A1 | 4/2003 | Deguillaume et al. | |
| 2003/0152225 A1 | 8/2003 | Kunisa | |
| 2004/0017852 A1 | 1/2004 | Garrido et al. | |
| 2004/0168110 A1 | 8/2004 | Fuldseth et al. | |
| 2004/0247154 A1 | 12/2004 | Bodo et al. | |
| 2005/0044411 A1 | 2/2005 | Somin et al. | |
| 2005/0069169 A1 | 3/2005 | Zarrabizadeh | |
| 2005/0123207 A1 | 6/2005 | Marpe et al. | |
| 2005/0207499 A1 | 9/2005 | Hwang et al. | |
| 2006/0078292 A1 | 4/2006 | Huang et al. | |
| 2006/0222344 A1 | 10/2006 | Ukai et al. | |
| 2006/0236130 A1 | 10/2006 | Ito et al. | |
| 2006/0269096 A1 | 11/2006 | Kumar et al. | |
| 2007/0053438 A1 | 3/2007 | Boyce et al. | |
| 2007/0110033 A1 | 5/2007 | Tu et al. | |
| 2007/0201720 A1 | 8/2007 | Rodriguez et al. | |
| 2007/0242862 A1 | 10/2007 | Watson et al. | |
| 2008/0009272 A1 | 1/2008 | Toledano | |
| 2008/0063071 A1 | 3/2008 | Suzuki | |
| 2008/0165849 A1 | 7/2008 | Moriya et al. | |
| 2008/0247469 A1 | 10/2008 | Vadapalli et al. | |
| 2009/0279603 A1 | 11/2009 | Chen et al. | |
| 2009/0290750 A1 | 11/2009 | Tapson et al. | |
| 2011/0129116 A1 | 6/2011 | Thorwirth | |
| 2011/0176610 A1 | 7/2011 | He et al. | |
| 2011/0222723 A1 | 9/2011 | He et al. | |
| 2011/0293016 A1 | 12/2011 | Suzuki | |
| 2012/0237078 A1 | 9/2012 | Watson et al. | |
| 2013/0058395 A1 | 3/2013 | Nilsson et al. | |
| 2013/0058405 A1 | 3/2013 | Zhao et al. | |
| 2013/0208814 A1 | 8/2013 | Argyropoulos et al. | |

FOREIGN PATENT DOCUMENTS

| | | |
|---|---|---|
| CN | 101236645 A | 8/2008 |
| EP | 1515506 | 3/2005 |
| EP | 1515506 A1 | 3/2005 |
| EP | 1909508 | 4/2008 |
| JP | 11331622 | 11/1999 |
| JP | 11341450 | 12/1999 |
| JP | 11346302 | 12/1999 |
| JP | 2001119557 | 4/2001 |
| JP | 2003125227 | 4/2003 |
| JP | 2003134329 | 5/2003 |
| JP | 2003179740 | 6/2003 |
| JP | 2003244419 | 8/2003 |
| JP | 2003529297 | 9/2003 |
| JP | 2004221715 | 8/2004 |
| JP | 2005533410 | 11/2005 |
| JP | 2006279992 | 10/2006 |
| JP | 2006287364 | 10/2006 |
| JP | 2006303580 | 11/2006 |
| JP | 2007053687 | 3/2007 |
| JP | 2007525074 | 8/2007 |
| WO | 2004066206 | 8/2004 |
| WO | WO2004066206 | 8/2004 |
| WO | 2007067168 | 6/2007 |
| WO | WO2008065814 | 6/2008 |
| WO | 2008118145 | 10/2008 |
| WO | 2008154041 | 12/2008 |

OTHER PUBLICATIONS

Song et al., "A Data Embedded Video Coding Scheme for Error-Prone Channels," IEEE Transactions on Multimedia, vol. 3, No. 4, Dec. 1, 2001, pp. 415-423.

Zou et al., "H.264/AVC stream replacement technique for video watermarking," Conference on Acoustics, Speech and Signal Processing 2008 (ICASSP 2008), Mar. 31, 2008, pp. 1749-1752.

Mobasseri et al., "Authentication of H.264 Streams by Direct Watermarking of CAVLC Blocks", Security, Steganography, and Watermarking of Multimedia Contents IX, Proceedings of SPIE-IS&T Electronic Imaging, SPIE, vol. 6505, 65951W, 2007.

Nguyen et al., "A Fast Watermarking System for H.264/AVC Video," 2006 IEEE, Dept. of Electronic Engineering, La Trobe University, Bundoora, Australia, pp. 81-84.

Seo et al., "Low-Complexity Watermarking Based on Entropy Coding in H.264/AVC," IEICE Trans. Fundamentals, vol. E91-A, No. 8, Aug. 2008.

Noorkami, "Secure and Robust Compressed-Domain Video Watermarking for H.264," A Thesis Presented to The Academic Faculty at Georgia Institute of Technology, 124 pages, Aug. 2007.

Hu, "Information Hiding Based on Intra Prediction Modes for H.264 AVC", Multimedia and Expo, 2007 IEEE, International Conference, IEEE PI, Jul. 1, 2007, pp. 1231-1234.

Winkler, "Preceptual Quality Assessments for Video Watermarking", Proceedings from the IEEE Conference on Standardization and Innovation in Information Technology, Oct. 18, 2002, pp. 90-94.

Profrock et al., "H.264/AVC Video Authentication using Skipped Macroblocks for an Erasable Watermark", Visual Communications and Image Processing, 2005 SPIE, Bellinigham, WA 2005.

* cited by examiner

WATERMARK DETECTION USING A PROPAGATION MAP

CROSS REFERENCE TO RELATED APPLICATIONS

This application claims the benefit, under 35 U.S.C. §365 of International Application PCT/US2011/000223, filed Feb. 7, 2011, which was published in accordance with PCT Article 21(2) on Aug. 18, 2011 in English and which claims the benefit of U.S. provisional patent application No. 61/337,726, filed Feb. 9, 2010.

TECHNICAL FIELD

The present invention relates to a process for detecting watermarks and using propagation maps in advanced video coding (AVC) watermarking.

BACKGROUND

Watermarks that change pixel values can cause secondary changes to adjacent parts of the imagery that use the changed pixels as a reference. Watermarks that change motion vector values can cause secondary changes to adjacent parts of the imagery that use the changed motion vectors as a reference.

Propagation maps have been used in a fidelity criterion (PCT/US09/004702 and PCT/US09/004752) to ensure that a proposed change will not introduce fidelity artifacts anywhere in the propagation path.

In H.264/AVC, a two-step watermarking modifies one block at a time. The watermark detector then analyzes that one block in the process of recovering the watermark payload. This method suffers when the watermarked content undergoes a geometric distortion prior to watermark recovery. Slight misalignments result in a large percentage of the target block being missed by the detector and can yield unreliable detection.

As such, a need exists for an improved watermark detection method that can capture geometric distortions that current detection schemes miss.

SUMMARY

A method is provided for detecting watermarks and using propagation maps in advanced video coding watermarking. The method can comprise accessing a propagation map associated with a watermark from a list having one or more watermarks; defining at least one detection criterion for blocks in the propagation map; identifying at least one region of at least one of the blocks contained within the propagation map, wherein the at least one region is grouped responsive to the at least one detection criterion; and producing information of the at least one region. The regions can be a group of connected blocks. There can be a plurality of different regions and blocks in one region can have a different signal than blocks in another region. The information can be spatial and/or temporal information, wherein spatial information could include at least the size of regions, the number of regions, the shape of the regions, and the location of the regions. The detection criterion can be change in luminance level and the signal can be the sign of the change. The method can further include determining the average change in luminance level for each region in each watermark and the information can include the average luminance. Additionally, the information for each region in each watermark can be prioritized such that each watermark has a priority region that is characterized by a metric, wherein the method could further comprise selecting a threshold metric and placing watermarks having priority regions exceeding the threshold metric in a preferred list of possible watermarks to apply to video data, wherein exceeding means outperforming the threshold metric.

A feature of the invention can further comprise generating a flag matrix to identify the at least one region and using the results to generate the preferred list of watermarks. This feature can comprise selecting a seed block for initiating the flag matrix from blocks within the propagation map, the seed block being part of at least one region; determining a signal of the seed block; populating the flag matrix with additional blocks adjacent to the seed block, the additional blocks have the same kind of signal as the seed block; continuing to populate the flag matrix with other blocks that are connected to the seed block through at least the additional blocks, wherein other blocks and any intervening blocks have the same kind of signal as the seed block; and assigning the seed block and any blocks in the populating and further populating steps to a first region, thereby producing the first region in the identifying step. A second region can be obtained by selecting another seed block from blocks within the propagation map that are not already assigned to at least one region; and running the determining step, populating step, further populating step, and assigning step for the another seed block. Additional regions can be obtained by continuing to select other seed blocks and running the determining step, populating step, further populating step, and assigning step for the other seed blocks until all the blocks in the propagation map are assigned. This feature can further comprise selecting a priority region of the propagation map for each watermark based on a metric; selecting a threshold metric; and placing watermarks having priority regions exceeding or outperforming the threshold metric in a select list of possible watermarks to apply to video data; wherein the metric is the at least one detection criterion and is a measure of luminance change; and the kind of signal is the sign of the luminance change.

BRIEF DESCRIPTION OF THE DRAWINGS

The present principles may be better understood in accordance with the following exemplary figures, in which.

DETAILED DESCRIPTION

The disclosure relates to a 2-step watermarking methods, wherein the two steps are as follows:

1. Select a list of changes that meet all watermarking criteria. The criteria can include fidelity, robustness, and compliance.
2. Use the watermark payload to execute a subset of those changes.

The focus of the disclosure is to use propagation maps in the robustness criterion of the first step and use propagation maps as an input as well for determining detection regions and estimating a robustness score in the detection region.

Regarding robustness, a simple measure of robustness is the amount of luminance change introduced by potential candidate changes. One assumes that candidate changes that result in higher luminance changes will be more robust. Any candidate for which the change in luminance is below the robustness threshold will be removed from the list candidate changes.

Particularly, the current disclosure is motivated by the desire to use one or more regions in the propagation map for detection. The detection region can be a single macroblock in the propagation map or a combination of multiple macroblocks. In many cases, larger detection regions can provide more robustness to certain geometric distortions. This takes advantage of the first step of candidate change selection. Here, several methods are proposed to evaluate the potential robustness of detection regions. Changes that result in strong robustness are preferred and descriptions of those regions are provided to the watermark detector as detection regions.

The motivation for the current disclosure includes that fact that watermarked content in the prior art two-step watermarking process can undergo a geometric distortion prior to watermark recover, wherein slight misalignments result in a large percentage of the target block being missed by the detector. The current disclosure specifically utilizes the propagation map for detection to achieve stronger robustness and overcome the shortcomings of the prior art.

An aspect of the disclosure is described with reference to FIG. 1. The input is a populated propagation map 10. The propagation map can take many forms and can generally be characterized as essentially lists of all the blocks in the imagery that would be affected by a change in the bitstream of a video to be watermarked. The propagation map 10 can be further populated with information regarding the specific change that would appear in each constituent block. In a preferred embodiment, the detection measure is total luminance.

This populated propagation map is the input to the region detection step 20, where the user can define at least one detection criterion which can be a detection measure to analyze and identify individual blocks within the propagation map for placing into specific regions which can be grown in final detection regions.

Figure 1:
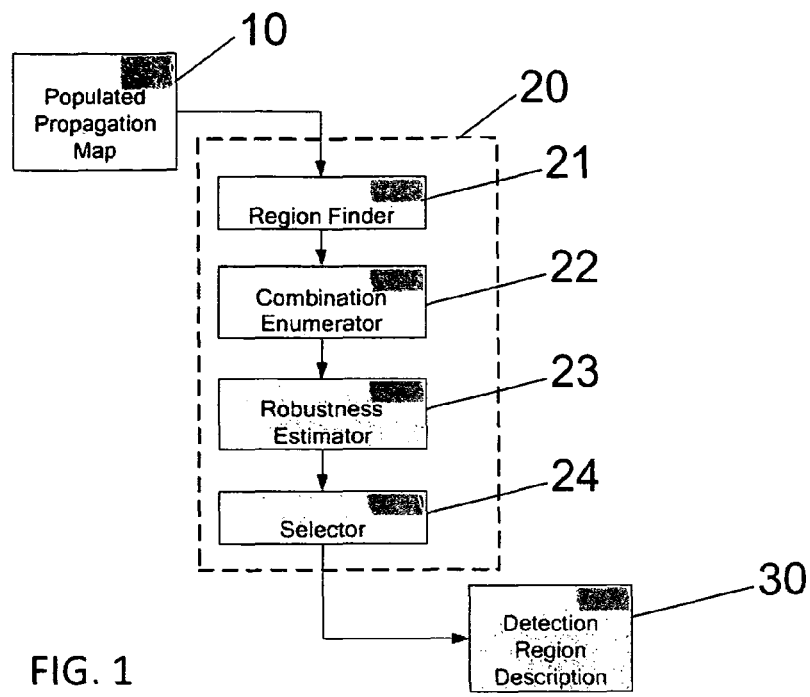
FIG. 1 is a block diagram of the method for determining a watermark detection region according to the invention.

The final output in FIG. 1 is a description of the detection region 30. This description indicates the spatial and/or temporal, extent of the detection region as well as a robustness score. The robustness score can indicate the estimated robustness of the detection region. Spatial information could include at least the size of regions, the number of regions, the shape of the regions, and the location of the regions.

FIG. 1 is shown for a single propagation map input. In practice in preprocessing, there will be a large list of possible watermarks and there will be a propagation maps for each watermark. This process flow shown in FIG. 1 would be applied to each of a large list of such propagation map inputs resulting in a large list of detection regions and robustness scores. A later process (e.g. the Changeable Block Selection as described in PCT/US09/004706) can use robustness score as one parameter in selecting the final set of changes. The detection region extent can be used by the detector for watermark recovery. In the end, what the user will have for each watermark is a propagation map in which there will be some identified detection region or regions therein and associated information or metric for each detection region. Next, the best detection region will be selected based on the information or metric for each watermark and then the best watermarks will be selected best of comparing the information or metric of the best detection region. Here, the user would select or define some threshold criteria for selecting or prioritizing the best watermarks and these best watermarks will be the watermarks placed in the list of possible watermarks to embed and the other watermarks will be excluded from the list. The best detection regions can be called a priority region.

Regarding watermark detection, watermarks can be detected from some analysis of the macroblock with maximum luminance change. Generally, a watermark with stronger energy will be more robust. If the size of detection region is fixed, a larger luminance change will be more robust than a smaller luminance change. In the case of 2-step watermarking, the primary change will result in a series of blocks having changes to their luminance at different levels. This forms the propagation map. A simple way to improve the robustness is to evaluate the total block luminance change of all the macroblocks in the propagation map, and select the macroblock that has the largest total luminance change as detection metric. Let P denote the propagation map with N macroblocks. A macroblock $b_i$ is one of the N macroblocks, i.e. $b_i \in P$, $1 \leq i \leq N$. Let $l_i$ denote the original total luminance of block $b_i$ and $l_i'$ denote the total luminance of block $b_i$ after watermark embedding. Then one can find block $b_k$ from $|l_k - l_k'| = \max(|l_i - l_i'|)$ where $1 \leq i \leq N$. The location of block k can be stored in the detection metadata for the detector.

Now the region finder 21 of FIG. 1 will be discussed. The region finder 21 reads in the information of the input populated propagation map 10, and outputs a collection of regions such that the blocks in the same region satisfy some predefined criteria, which can be called a detection criterion or criteria.

In one embodiment, the criteria for blocks being classified into one region are that they are 4-connected and their luminance changes are of the same sign. Two blocks are 4-connected if they are spatially adjacent to each other, horizontally or vertically. Thus, a single block is 4-connected to exactly 4 other blocks, which are the one above, the one below, the one on the right, and one on the left. In order words, adjacent blocks for consideration are considered the immediate blocks are above, below, to the right and to the left. Non-corner blocks on the border of the image are connected to three other blocks and corner blocks are connected to two blocks. A region in which every block is connected to at least one other block in the region will also be called a 4-connected region.

The problem of finding a connected region within a certain area can be solved by common segmentation algorithms such as region-growth and split and merge. One can employ a region growing algorithm. After reading the input information of the propagation map, one builds a flag matrix for the propagation map with each entry indicating the status of the corresponding block. This flag matrix is initialized with zeros.

The search algorithm starts with a seed block for region finding. The seed block is any block corresponding to a 0 entry in the flag matrix and is therefore not yet assigned to any region. The first region will be labeled beginning with an index value of 1. From the first seed block the first region is found. When the first region is complete, the algorithm assigns the next, consecutive region index value to the next seed block and replaces the 0 in the flag matrix with this index. Once a seed block is obtained, the four 4-connected neighbors of the seed block are examined unless the seed block is at the edge of the propagation map in which case there will be less than four neighbors. If a neighbor block has the flag value 0 which implies that it is not yet assigned to region) and the sign of the luminance change is the same as that of the corresponding seed block, the block becomes part of the current region and the entry in the flag matrix is replaced with the current region index. This block is then added to a queue for further analysis, which implies that this block's neighbor will be examined. After all of the 4-connected neighbors have been examined, the process is repeated with the first block on the queue: all of its 4-connected neighbors are examined; blocks that are not yet assigned to a region and have the same sign luminance change are placed on the queue and their corresponding entry in the flag matrix is set to the region index. This process continues until the queue is empty. At this point, one has finished identifying one region. If there are any blocks with 0 entries in the flag matrix remaining, one of these is selected to be the next seed block, the region index is incremented, and the process repeats.

Figure 2:
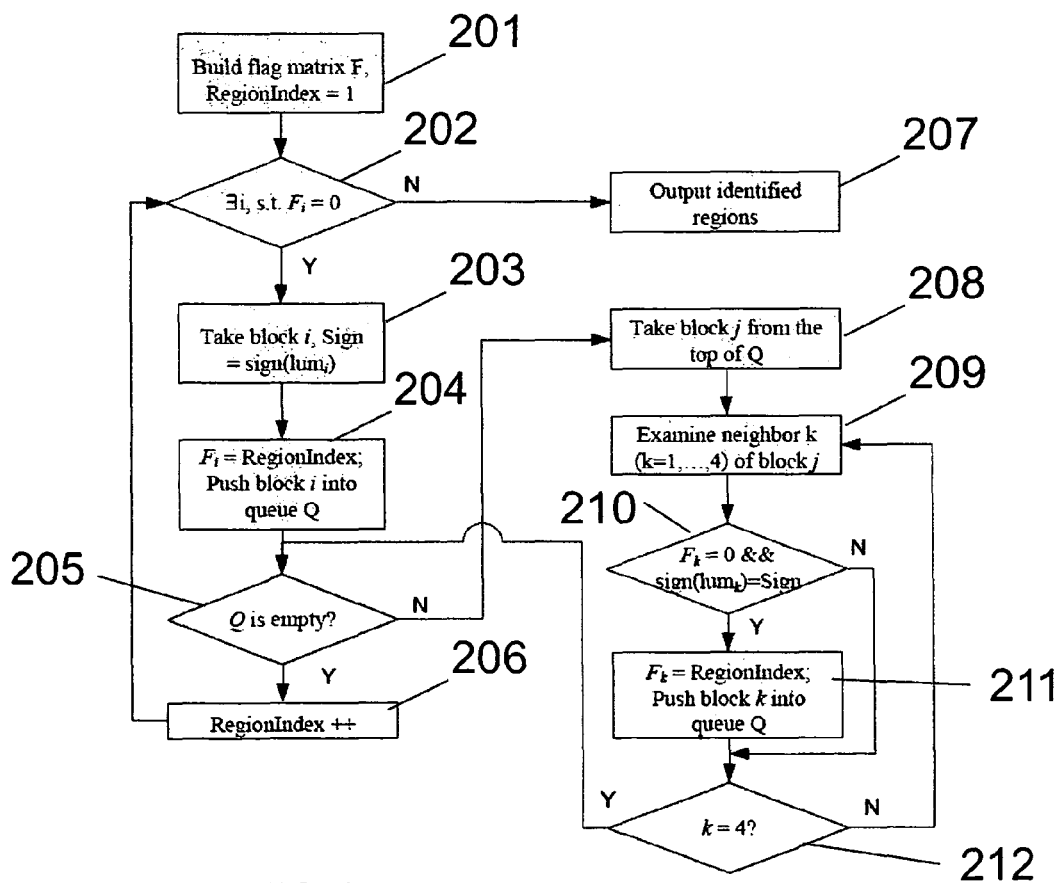
FIG. 2 is a block diagram of an algorithm for generating a detection region for the method in FIG. 1.

The search algorithm is generally shown in FIG. 2 and starts with a seed block, which can be a randomly selected block within the propagation map or selected according to some protocol. Regardless of how the seed block is selected, it is important to point out that in a preferred embodiment all of the blocks in the propagation map will be examined and placed in a region. At the start of the algorithm all blocks in the propagation map are assigned an index of 0 which is stored in flag matrix F, and a first region index of 1 is assigned to RegionIndex variable in step 201. In step 202, a block i with flag 0, implying that the block has not been assigned to any region, is selected. The sign of the statistic value, such as the luminance value, of the block is recorded in step 203. In step 204, block i's flag $F_i$ is assigned the value of RegionIndex, currently 1, and block i is then placed in the queue Q In step 205, the queue Q is checked for emptiness. If it is not empty, the first block j in the queue will be taken from the queue in step 208 and each of its four adjacent blocks is examined in Step 209. In step 210, if the neighbor block k has flag 0 and the sign of the block k is compared to that of the current seed block and if their signs are the same, then block k will be placed in the queue Q in Step 211, and in the meanwhile its flag is assigned the value of region index RegionIndex. The adjacent blocks k not having the same sign will eventually be assigned another index number, but will not be placed in the queue in the current round. Each of the four neighbor blocks is examined in the same way until all of them have been examined in step 212. Then the next block in the queue Q is picked which will go through the same process loops through steps 209, 210, 211 and 212 until the queue is empty, which implies the algorithm has found the boundary for the first region of connected blocks of index 1 and the outer neighbors of the peripheral blocks of the first region have a different sign than the seed block.

When the queue is empty after a region has been completely identified, the algorithm advances by assigning the next, consecutive region index value in step 206 to another seed block and subsequent adjacent blocks of index 0 and the same sign as the current seed block that are processed will be given the next index number. The algorithm runs through the process steps beginning with step 202 to map out this next region.

The algorithm will run repeatedly until there are no blocks with 0 entries remaining. At this point, the flag matrix is set.

Note that this segmentation, based on connected regions with the same sign in statistics of the block, such as a luminance change, is unique. There is only one such segmentation. Thus, the choice and order of seed blocks does not influence the segmentation. As such, the seed blocks can be selected randomly.

An alternative embodiment of the region finder is that each block is considered an independent region. In this special case, the region finder is essentially an optional component as it does not change the information from input to output.

Figure 3:
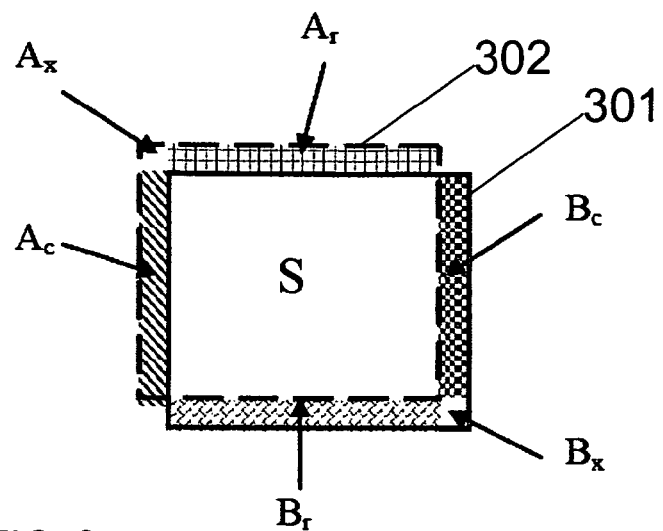
FIG. 3 shows a connected region according to the invention which includes A pixels that are part of an original block, but not included in the detection due to a shift and which includes B pixels that are not part of the original block, but are included during the detection due to the shift.

Another embodiment shown in FIG. 3 involves selecting a connected region with a robustness score defined based on the luminance difference of its border pixels. This is designed to resist shifting attack. Specifically, two areas are defined for each macroblock and here an example of shifting left and up by one pixel is employed to illustrate these areas. Area A includes the pixels that are part of the original block, but are not included in detection due to the shift. Area contains subareas $A_c$, $A_r$ and $A_x$ as shown in FIG. 3. $A_c$ is a 15-by-1 area, $A_r$ is a 1-by-15 area, and $A_x$ contains just one pixel. Area B includes the pixels that are not part of the original block, but are included during the detection due to the shift. Area B contains subareas $B_c$, $B_r$ and $B_x$. $B_c$ is a 15-by-1 area, $B_r$ is a 1-by-15 area, and $B_X$ contains just one pixel. S is used to denote the remaining part of the block that has been calculated correctly. Note that here one uses a 16 by 16 macroblock as an example. In case of other block sizes, the sizes of subareas in A and B change accordingly.

Figure 4:
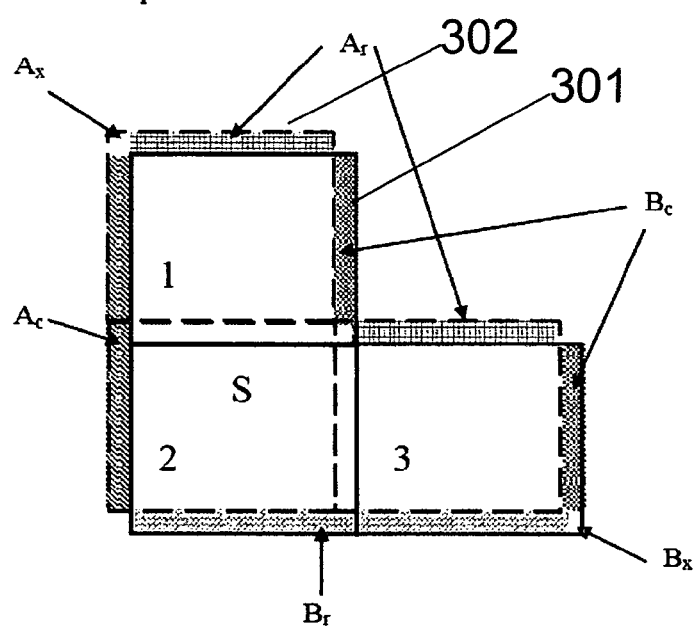
FIG. 4 shows another view a connected region involving A and B pixels and shifting.

The pixel values of the border pixels of each macroblock are calculated and recorded as shown in FIG. 4. Specifically, the luminance sum of the areas $A_r$, $A_c$, $A_x$ and $B_r$, $B_c$, $B_X$ are calculated. In this figure, the area 301 identifies the position of the original macroblock, while the area 302 indicates the position of the same block after shifting left and up by 1 pixel. The detector, which does not have the information of how much the block is shifted, would use the region delimited by the area 301 to calculate the detection statistic based on the luminance sum inside the macroblock. This would have the effect of having the actual pixel values in $A_r$, $A_c$, and $A_x$ missing and the pixels in $B_r$, $B_c$, and $B_x$ included by mistake.

A new robustness measure $R_s$ is defined as $$R_s = 1 - Err_{\Delta L} \tag{1}$$

where $$Err_{\Delta L} = \frac{|lum(B) - lum(A)|}{\Delta L_{total}}$$
$$= \frac{|lum(B_c + B_r + B_x) - lum(A_c + A_r + A_x)|}{|\Delta L(A_c + A_r + A_x + S)|}$$

One can see that if the luminance calculation error due to shift is small compared with the luminance change of the macroblock, then the error rate $Err_{\Delta L}$ is small and the robust metric $R_s$ is high. On the other hand, if the error is high compared with the total luminance change, which can be, for example, higher than 1, the robust metric $R_s$ can be negative. Intuitively, one should avoid selecting such regions, where the watermark can be totally destroyed by slight shifting.

With the newly defined robust metric, one can update the connected region identification process in the following way. First, one picks the macroblock among the blocks on the propagation map which has the highest $R_s$. Starting from this block, one adds new blocks which have 4 way connectivity with one of the blocks in the current region only when the $R_s$ of the region becomes higher after incorporating the block. The area A and area B of a connected region can be derived from the area A and B of each individual macroblock. For example, the area A and B for the region shown in FIG. 4 can be derived as:

$$A_c = A_{C1} \cup A_{c2} \cup A_{x2};$$

$A_r = A_{r1} \cup A_{r3}$;

$B_c = B_{c1} \cup B_{c3}$;

$B_r = B_{r2} \cup B_{r3} \cup B_{x2}$;

$A_x = A_{x1}$; $B_x = B_{x3}$.

Accordingly, the robust metric $R_s$ for a connected region can be defined using its area A and B.

Figure 5:
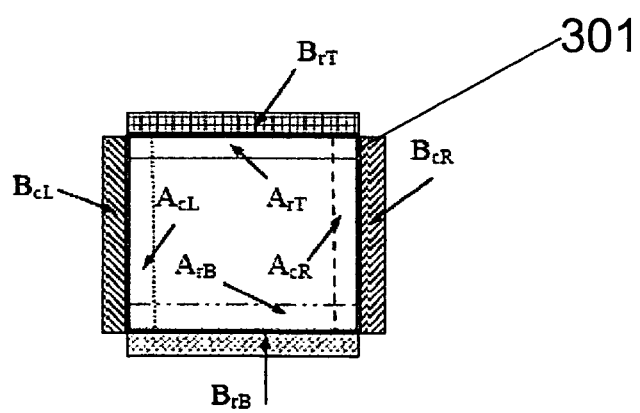
FIG. 5 shows another view a connected region that involves luminance sums of A and B pixels.

Note that the shifting attack can be in any direction and the corresponding area A and area B would be different. To simplify the implementation, one calculates the following eight luminance sums: $A_{cL}$, $A_{cR}$, $A_{rT}$, $A_{rB}$, $B_{cL}$, $B_{cR}$, $B_{rT}$, $B_{rB}$ as shown in FIG. 5. Here, $A_{cL}$ and $A_{cR}$ are luminance sums of the left-most and right-most columns of the macroblock, respectively; $A_{rT}$ and $A_{rB}$ are the first and last row luminance sum, respectively; $B_{cL}$ and $B_{cR}$ are the luminance sum of the immediate left column and right column neighbors, respectively; and $B_{rT}$ and $B_{rB}$ are the luminance sum of the top and bottom row neighbors, respectively. In general, these eight luminance regions can be defined for multiple columns/rows.

With the calculated luminance sum $A_s$ and $B_s$, one is able to estimate the luminance error introduced due to shifting. For example, when the frame is shifted to left by one pixel, the luminance error at the detection would be $B_{CR} - A_{cL}$. When the frame is shifted to upper left by one pixel, the error can be estimated as $B_{cR} + B_{rB} - (A_{cL} + A_{rT}) = (B_{cR} - A_{cL}) + (B_{rB} - A_{rT})$. Note that the shifting errors consist of one or more of 4 basic elements: $(B_{CR} - A_{CL})$, $(B_{cL} - A_{cR})$, $(B_{rT} - A_{rB})$, $(B_{rB} - A_{rT})$. This indicates that these four terms can be used to measure the robustness of the block to shifting attack. One can choose to use $\max(|B_{cR} - A_{CL}|, |B_{cL} - A_{cR}|, |B_{rT} - A_{rB}|, |B_{rB} - A_{rT}|)$, which is the worst case scenario. Alternatively, one can use the average value of the four errors, which is $(|B_{cR} - A_{cL}| + |B_{cL} - A_{cR}| + |B_{rT} - A_{rB}| + |B_{rB} - A_{rT}|)/4$, in the calculation of $Err_{\Delta L}$ metric, which is the average case scenario.

With the simplification in FIG. 5, the update of the eight measurements for regions with any shape can be performed easily. For each block, one records its neighbor availability. If a block does not have a right (left) neighbor, then its $A_{cR}$ ($A_{cL}$) will be part of the $A_{cR}$ ($A_{cL}$) of the whole region. Similarly, $A_{rT}$ ($A_{rB}$) of a region is the sum of the $A_{rT}$s($A_{rB}$s) of those blocks without a top (bottom) neighbor. The same calculation applies to the $B_{cL}$, $B_{cR}$, $B_{rT}$, $B_{rB}$. Then the $Err_{\Delta L}$ is updated as $$Err_{\Delta L} = \frac{\max(|B_{cR} - A_{cL}|, |B_{cL} - A_{cR}|, |B_{rT} - A_{rB}|, |B_{rB} - A_{rT}|)}{\Delta L_{total}} \quad (2)$$

for a worse case scenario, and $$Err_{\Delta L} = \frac{(|B_{cR} - A_{cL}| + |B_{cL} - A_{cR}| + |B_{rT} - A_{rB}| + |B_{rB} - A_{rT}|)}{4\Delta L_{total}} \quad (3)$$

for an average case scenario.

The combination enumerator 22, which follows the Region Finder 21 in FIG. 1, is a process that generates all possible combinations of the regions listed at the input. An exhaustive listing can be achieved by using a binary accumulator as is described by the following algorithm. This algorithm extensively lists all $2^N - 1$ combinations of N different regions.

a. Form a binary counter with N bits, where N represents the total number of regions. Assign each region to a bit location in this binary counter.

b. Set the initial value of the binary counter to 0.

c. Increase the value of this binary counter by 1.

d. Combine all regions for corresponding to a bit value of 1 in the current counter value. Add this combined region to the list of combinations.

e. Go to step c until the value of the counter is $2^N - 1$

The robustness estimator 23, which follows the combination enumerator 22 in FIG. 1, evaluates each of the enumerated combined regions and assigns a robustness score to each. The robustness score corresponds to an estimate of the robustness of the region such that the regions expected to be most robust can be identified.

Here, the term "most robust" is vague, as different applications require different levels of robustness to different distortions. In this formulation, first one defines a number of simple robustness measures and then combines those measures to obtain a robustness score. One can represent this in a general form as shown in Equation 4.

$$R = F(r_1, r_2 \ldots r_k) \quad (4)$$

where $r_1, r_2, \ldots r_K$ are the simple robustness measures and R is the robustness score. The function F can be represented as some prototype formulation of $r_1, r_2, \ldots r_K$ controlled by a set of parameters $\alpha_1, \alpha_2, \ldots \alpha_m$. For a given formulation, the best set of parameter values can be empirically determined. For example, one can formulate the function F as a linear combination of $r_1, r_2, \ldots r_K$ as shown in Equation 2.

$$R = \alpha_1 r_1 + \alpha_2 r_2 + \ldots + \alpha_K r_K \quad (5)$$

where one normalizes the parameters such that $$\sum_i \alpha_i = 1.0.$$

R can be referred to as the linear robustness score.

Another example formulation can be described by Equation 6, where the robustness measures are combined non-linearly and the resulting R is called the non-linear robustness score.

$$R = r_1^{\alpha_1} \times r_2^{\alpha_2} \times \ldots \times r_K^{\alpha_K} \quad (6)$$

In a preferred embodiment, one chooses two robustness measures: $r_G$ for geometric distortions and $r_v$ for valuemetric distortions. $r_G$ measures the percentage of accurate pixels included in the detection region after shifting distortion. The higher the $r_G$ is, the more pixels in the distorted detection region belong to the original detection region and a more accurate detection is expected. One chooses $r_G$ to be defined based on shifting operation for simplicity. One can see that a higher $r_G$ indicates higher robustness to other types of geometric distortions as well, such as rotation. $r_G$ is defined as $$r_G = 1 - \frac{\text{\# wrong pixels in the region after shifting one pixel both horizontally and vertically}}{\text{the size of the region in pixels}}$$

Alternatively, one can use the robustness metric defined in Equation (1) along with Equation (2) or (3) for $r_G$.

$r_v$ measures the average luminance change per pixel due to watermark embedding. Apparently, the higher the $r_v$ is, the more robust the region is to value metric distortions, such as additive noise. $r_v$ is defined as $$r_v = \frac{\text{the total luminance change in the region due to watermark embedding}}{\text{the size of the region in pixels}}$$

With these two robustness measures, the linear robustness score would be $$R = \alpha_1 r_G + \alpha_2 r_v, \quad (7)$$

and the nonlinear robustness score would be $$R = r_G^{\alpha_1} \times r_v^{\alpha_2}. \quad (8)$$

Given a robustness estimator (formulation and parameter values), one can calculate the robustness score for each of the combined regions that come from the combination enumerator 22. The result is then passed to the selector 24. The parameters indicate the relative importance of the various robustness measures and can be set according to requirements of the application or determined experimentally to achieve optimum performance. The following experimental method is introduced to estimate the parameters.

One method for establishing the parameter values is to select a test data set and a set of distortions and then search the parameter space for the set of parameter values that yield the highest correlation between the detection result and the robustness score specified by Equation 4. The rationale behind this method is that watermark changes that have a high robustness score should have a high detection result. Likewise, changes that have a low robustness score should have a low detection result.

Figure 6:
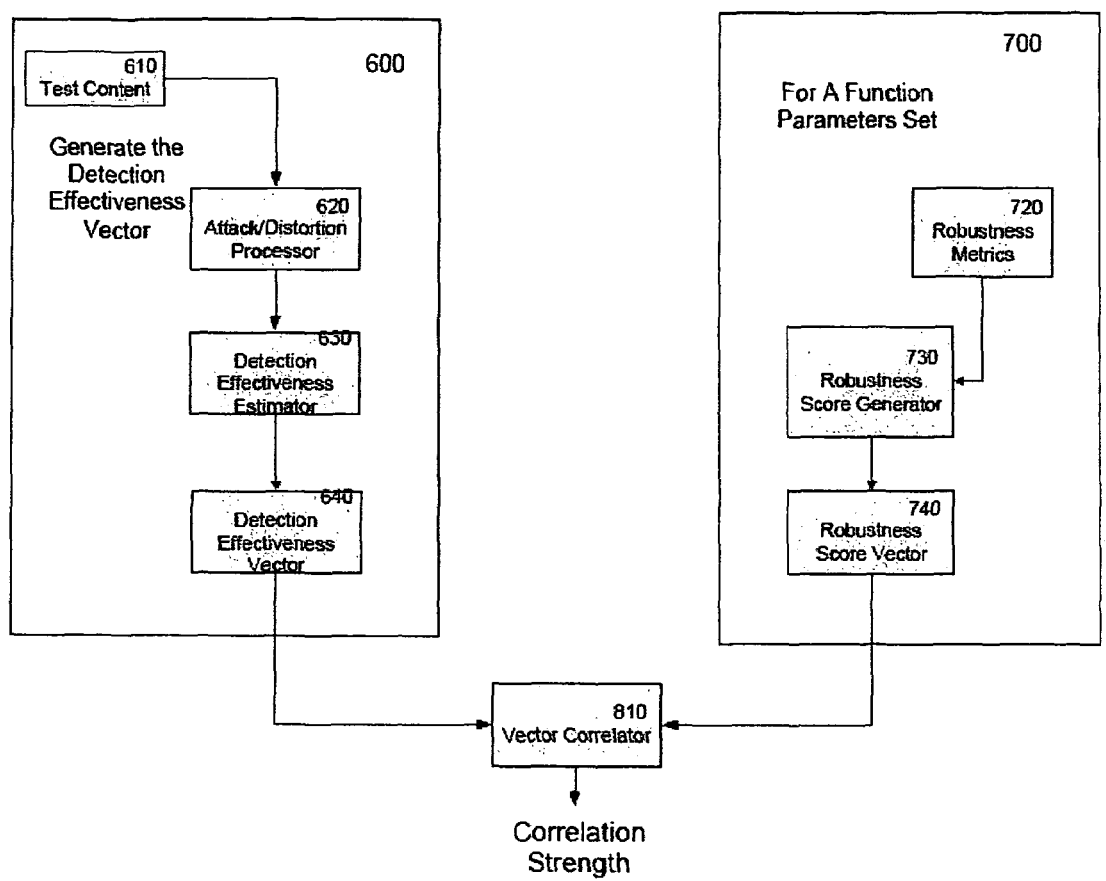
FIG. 6 is a block diagram of the method for the optimal detection parameters according to the invention.

FIG. 6 describes the process to estimate the optimal parameters given an empirically formulation. In the detection effectiveness vector path 600, watermarked content 610 is fed into a distortion module 620, where the distortion model is determined by the application in which the watermarking is used. A detection effectiveness estimator 630 estimates the detection result. Then a detection effectiveness vector 640 is formed.

To obtain the optimum parameters set for the test content, all parameter combinations will be tested. For each parameters set, in the function parameters set path 700, one calculates the robustness score 730 of the embedded watermarks from robustness metrics 720. Then a robustness score vector 740 is formed for each parameters set.

A vector correlator 810 correlates the two vectors generated previously and obtains a correlation value. The one parameter set that gives the largest correlation should reflect the best robustness function that measures the robustness of the watermark under the expected distortion model.

One example of the detection effectiveness measurements can be the difference between the embedded watermark sequence, denoted as $L_e$, and the extracted test sequence from the attacked/distorted content, denoted as $L_d$. Intuitively, for detection region i, if $L_{di}$ deviates substantially from $L_{ei}$, i.e. $|(L_{di}-L_{ei})/L_{ei}|$ carries a large value, one would assume region i is less robust to the designed attack. Consequently, it should have a small robust metric. Similarly, if $|(L_{di}-L_{ei})/L_{ei}|$ is a small value, region i will be identified as robust to the designed attack and thus the corresponding robustness metric should be large.

The goal is to achieve a positive correlation between the detection effectiveness measurement and the robustness metric. Therefore, the complement of the difference $|(L_{di}-L_{ei})/L_{ei}|$ is employed as the detection effectiveness measurement $M_{di}$, which is defined as $M_{di} = 1 - \min(1, |(L_{di}-L_{ei})/L_{ei}|)$.

One uses 1 to bound the difference $|(L_{di}-L_{ei})/L_{ei}|$ in order to reduce the effect of outliers in $|(L_{di}-L_{ei})/L_{ei}|$. $M_{di}$ measures how much the extracted watermark matches the embedded watermark. The larger $M_{di}$ is, the higher the robustness of the detection is.

Now with the estimated robustness performed in FIG. 1, the selector 24 is employed. The selector 24 is a process to select the region combination that has the biggest robustness measurement. Then, the selector 24 provides the output region combination information together with other information needed by the watermark detector for watermark detection.

The invention claimed is:

1. A method comprising:
   accessing a propagation map associated with a watermark from a list having one or more watermarks;
   defining at least one detection criterion for blocks in the propagation map;
   generating a flag matrix to identify at least one region;
   selecting a seed block for initiating the flag matrix from blocks within the propagation map, the seed block being part of the at least one region;
   determining a signal of the seed block;
   populating the flag matrix with additional blocks adjacent to the seed block, the additional blocks have the same kind of signal as the seed block;
   continuing to populate the flag matrix with other blocks that are connected to the seed block through at least the additional blocks, wherein other blocks and any intervening blocks have the same kind of signal as the seed block;
   assigning the seed block and any blocks in the populating and further populating to a first region, thereby producing the first region for identifying the at least one region;
   identifying the at least one region of at least one of the blocks contained within the propagation map, wherein the at least one region is grouped responsive to the at least one detection criterion; and
   producing information of the at least one region.

2. The method of claim 1 wherein the at least one region is a group of connected blocks.

3. The method of claim 2 wherein there are a plurality of different regions and blocks in at least one region have a different signal than blocks in another region.

4. The method of claim 1 wherein the information is spatial information.

5. The method of claim 4 wherein the spatial information includes at least the size of regions, the number of regions, the shape of the regions, and the location of the regions.

6. The method of claim 1 wherein the information is temporal information.

7. The method of claim 1 wherein the information is spatiotemporal information.

8. The method of claim 1, wherein the detection criterion is change in luminance level.

9. The method of claim 3, wherein the detection criterion is change in luminance level and the signal is the sign of the change.

10. The method of claim 9, wherein the average change in luminance level is determined for each region in each watermark and the information includes the average luminance.

11. The method of claim 3, wherein the information for each region in each watermark is prioritized such that each watermark has a priority region that is characterized by a metric.

12. The method of claim 11 further comprises
    selecting a threshold metric; and
    placing watermarks having priority regions exceeding or outperforming the threshold metric in a list of possible watermarks to apply to video data.

13. The method of claim 1 further comprises:
selecting another seed block to determine a second region for further population the flag matrix from blocks within the propagation map that are not already assigned to at least one region; and
running the determining, populating, further populating, and assigning for the another seed block, thereby producing the second region in the identifying.

14. The method of claim 13 further comprises:
continuing to select other seed blocks and running the determining, populating, further populating, and assigning for the other seed blocks until all the blocks in the propagation map are assigned, thereby producing other regions in the identifying.

15. The method of claim 14 further comprises:
selecting a priority region of the propagation map for each watermark based on a metric;
selecting a threshold metric; and
placing watermarks having priority regions exceeding or outperforming the threshold metric in a select list of possible watermarks to apply to video data.

16. The method of claim 15 wherein:
the metric is the at least one detection criterion and is a measure of luminance change; and
the kind of signal is the sign of the luminance change.

17. A method comprising:
accessing or generating a list of possible watermarks to apply to video;
generating individual propagation maps of modifications to the video that would be caused by applying the respective watermarks, the propagation maps each being a collection of constituent blocks of the video modified by the respective watermarks;
generating a detection region responsive to each respective propagation map that includes blocks within the propagation map that collectively rank highest with respect to a selected detection criterion compared to each other region within the propagation map;
selecting a threshold metric for evaluating detection regions; and
removing watermarks from the list responsive to a comparison of their detection regions with the threshold metric.

18. The method of claim 17 further comprising:
defining the selected detection criterion for the blocks in the propagation maps;
identifying at least one region of at least one of the blocks contained within each propagation map, wherein the at least one region is grouped responsive to the selected detection criterion; and
producing information of the at least one region.

19. The method of claim 17, wherein the selected detection criterion is change in luminance level.

20. The method of claim 17 further comprising:
placing watermarks having priority regions exceeding or outperforming the threshold metric in a list of possible watermarks to apply to video data.

21. An apparatus that accesses or generates a list of possible watermarks to apply to video comprises:
a decoder that generates individual propagation maps of modifications to the video that would be caused by applying the respective watermarks, the propagation maps each being a collection of constituent blocks of the video modified by the respective watermarks; and
a watermark detector that receives a generated detection region by the apparatus responsive to each respective propagation map that includes blocks within the propagation map that collectively rank highest with respect to a selected detection criterion compared to each other region within the propagation map;
wherein the watermark detector employs a threshold metric selected for evaluating detection regions; and
wherein the watermark detector causes removal of watermarks from the list responsive to a comparison of their detection regions with the threshold metric.

* * * * *